United States Patent
Michimoto et al.

(10) Patent No.: US 8,170,277 B2
(45) Date of Patent: May 1, 2012

(54) AUTOMATIC TRACKING APPARATUS AND AUTOMATIC TRACKING METHOD

(75) Inventors: Yasuyuki Michimoto, Ishikawa (JP); Satoru Ooyabu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 944 days.

(21) Appl. No.: 12/162,823

(22) PCT Filed: Jan. 30, 2007

(86) PCT No.: PCT/JP2007/051512
§ 371 (c)(1),
(2), (4) Date: Jul. 31, 2008

(87) PCT Pub. No.: WO2007/088856
PCT Pub. Date: Aug. 9, 2007

(65) Prior Publication Data
US 2009/0028386 A1   Jan. 29, 2009

(30) Foreign Application Priority Data
Jan. 31, 2006   (JP) .................................. 2006-022887

(51) Int. Cl.
*G06K 9/00*   (2006.01)
(52) U.S. Cl. ........ 382/103; 348/169; 348/170; 348/171; 348/172; 348/173; 356/27; 356/28; 356/29; 356/30; 356/31; 73/488; 73/489; 73/490; 73/491; 73/492
(58) Field of Classification Search .......... 382/100–107; 348/169–175; 356/27–33; 73/488–492
See application file for complete search history.

(56) References Cited

U.S. PATENT DOCUMENTS 4,991,944 A   2/1991   Hirao et al.
(Continued)

FOREIGN PATENT DOCUMENTS

GB   2 257 544 A   1/1993
(Continued)

OTHER PUBLICATIONS

International Search Report.
(Continued)

*Primary Examiner* — Atiba O Fitzpatrick
(74) *Attorney, Agent, or Firm* — Pearne & Gordon LLP

(57) ABSTRACT

An automatic tracking apparatus is provided, which is capable of solving a failure occurred in an automatic tracking operation in connection with a zooming operation, and capable of tracking an object in a stable manner, while a zooming-up operation, or a zooming-down operation is carried out in a high speed.

The automatic tracking apparatus is equipped with: a first object detecting unit 52 for detecting an object from an image photographed by a camera and inputted; a first zooming control unit 53 for changing zooming magnification of the camera in such a case that a dimension of the detected object is smaller than a predetermined dimension on the image; a second object detecting unit 55 for detecting the object from an image again photographed by the camera after the zooming magnification has been changed; a template matching unit 56 for comparing the object detected by the second object detecting unit with the image photographed by the camera so as to specify a position of the object and to track the object on the image; and a second zooming control unit 57 for controlling the zooming magnification of the camera in such a manner that a dimension of the object to be tracked becomes a predetermined dimension on an image which is photographed by the camera.

16 Claims, 7 Drawing Sheets

U.S. PATENT DOCUMENTS

| | | |
|---|---|---|
| 2003/0103648 A1 | 6/2003 | Ito et al. |
| 2006/0203119 A1* | 9/2006 | Masuda ................. 348/347 |

FOREIGN PATENT DOCUMENTS

| | | |
|---|---|---|
| GB | 2 271 442 A | 4/1994 |
| JP | 10-32746 A | 2/1998 |
| JP | 11-331828 A | 11/1999 |
| JP | 2000-322581 | 11/2000 |
| JP | 2001-243476 | 9/2001 |
| JP | 2001-285850 | 10/2001 |
| JP | 2002-374521 | 12/2002 |
| JP | 2005-045383 | 2/2005 |
| JP | 2005-57743 A | 3/2005 |

OTHER PUBLICATIONS

Supplementary European Search Report in reference to PCT/JP2007051512 dated Oct. 19, 2010.

* cited by examiner

AUTOMATIC TRACKING APPARATUS AND AUTOMATIC TRACKING METHOD

TECHNICAL FIELD

The present invention is related to an automatic tracking apparatus and an automatic tracking method, which track a moving object.

BACKGROUND ART

Conventionally, as automatic tracking apparatuses, the below-mentioned monitoring systems are known in the field. That is, while the monitoring systems are equipped with cameras having panning, tilting, and zooming functions (namely, PTZ functions), the monitoring systems perform automatic tracking operations in such a manner that objects invaded into predetermined areas are detected, and furthermore, the detected objects are zoomed up in order that the zoomed-up objects may be photographed with having proper dimensions thereof, so that the invaded objects may be grasped in more detail.

Generally speaking, in the above-described monitoring systems, zooming magnification of the cameras have been set to wide-angle sides under initial conditions in order to monitor wide areas. After the invaded objects have been detected, if the detected invaded objects are rapidly zoomed up in order to transfer the present operation conditions to the automatic tracking conditions, then deformation amounts of images are increased, and thus, operators may easily lose track of the invaded objects, while the invaded objects are being tracked by performing block matching operations, template matching operations, and the like. As a consequence, the invaded objects are zoomed at relatively low speeds in such a condition that adverse influences caused by enlarging and compressing images can be hardly given.

As the conventional automatic tracking apparatuses, one automatic tracking apparatus is known from a patent publication 1. This automatic tracking apparatus has been arranged by a first image memory, a second image memory, a demultiplexer, a correlation calculator, and a moving object sensing program. The correlation calculator is constructed of hardware, and predicts a motion vector among such images whose photographing times are different from each other, while these images have been stored in the image memories. The moving object sensing program controls the correlation calculator in order to sense whether or not a moving object is present within an image photographed by a camera. Concretely speaking, the image is divided into a plurality of blocks, and then, a motion vector is calculated every block by the correlation calculator. The moving object sensing program traces the calculated vector so as to discriminate motion of a person from such a disturbance as swinging of a tree. When the moving object sensing program discriminates the motion of the person from the disturbance, the below-mentioned fact is utilized: That is, motion vectors such as persons may appear with having substantially same dimensions along a constant direction, whereas motion such as swinging of trees is produced in vibrating manners, so that motion vectors thereof do not continuously appear along the constant direction. Then, in such a case that motion vectors have been detected in a cluster shape, the moving object sensing program commences a tracking operation.

In the case that the camera itself performs a panning operation and a tilting operation, the automatic tracking apparatus extracts background motion vectors indicative of motion of the camera itself, and subtracts the background motion vectors from the vectors of the respective blocks, and thus, extracts motion vectors of an object so as to track the object. When a zooming operation is carried out during the tracking operation of the object, the automatic tracking apparatus predicts a change amount of enlarging an image and a change amount of compressing the image from the motion vectors, and predicts a motion vector of the object by subtracting the predicted change amounts from the vectors of the respective blocks so as to reduce adverse influences caused by the zooming operation, which are given to the tracking operation.

Another conventional automatic tracking apparatus is known from a patent publication 2. In order to solve the below-mentioned problem, this automatic tracking apparatus enlarges and compresses an area of a moving object extracted from imaging data based upon a plurality of arbitrary magnification so as to form a plurality of template images. In the above-described problem, in such a case that the moving object is enlarged and compressed by zooming this moving object, a dimension of a template image is not made coincident with a dimension of the moving object contained in the photograph data, so that the moving object cannot be tracked. When the moving object is enlarged and compressed by zooming this moving object, such template matching operations are carried out by employing template images of enlargement ratios and compression ratios, which correspond to dimensions of the enlarged images and dimensions of the compressed images, and thus, the moving object is tracked while considering correlation between these template images and the moving object.

Patent Publication 1: JP-A-2000-322581
Patent publication 2: JP-A-2001-243476

DISCLOSURE OF THE INVENTION

Problems that the Invention is to Solve

However, as previously described, in the above-described automatic tracking apparatuses, the zooming operations are carried out at relatively lower speeds in order that adverse influences caused by enlarging and compressing the images can be hardly given. In this case, such a condition that the zooming magnification has been changed up to the desirable value is continued for a long time. As a result, tracking process operations may readily become unstable, for instance, tracking of the moving objects may fail. On the other hand, after an invaded object has been detected, if such a zooming-up operation for transferring the present condition to the automatic tracking condition is carried out at a high speed, then changing degrees of enlarging, or compressing the image are excessively increased, so that an operator may readily lose track of the object.

The present invention has been made to solve the above-described problems, and therefore, has an object to provide an automatic tracking apparatus and an automatic tracking method, which are capable of solving a failure occurred in an automatic tracking operation in connection with a zooming operation, and capable of tracking an object in a stable manner, while a zooming-up operation, or a zooming-down operation is carried out in a high speed.

Means for Solving the Problem

An automatic tracking apparatus, according to the present invention, is featured by such an automatic tracking apparatus for tracking a moving object, comprising: a camera having a zooming mechanism, for photographing at a predetermined image angle; first object detecting means for detecting the object from an image photographed by the camera; first zooming control means for changing zooming magnification of the camera in such a case that a dimension of the detected object cannot satisfy a predetermined condition on the image; second object detecting means for detecting the object from an image again photographed by the camera after the zooming magnification has been changed; tracking means for comparing the object detected by the second object detecting means with the image photographed by the camera so as to specify a position of the object and to track the object on the image; and second zooming control means for controlling the zooming magnification of the camera in such a manner that a dimension of the object to be tracked becomes a predetermined dimension on an image which is photographed by the camera.

With employment of the above-described arrangement, the operations are separated from each other in a temporal mode in such a manner that the zooming-up operation is carried out from the wide-angle image before the tracking operation is carried out, and thereafter, the automatic tracking operation is carried out. As a result, it is possible to avoid such a phenomenon that the operator loses track of the tracking point, which may easily occur while the zooming-up process operation is carried out. As a consequence, while either the zooming-up operation or the zooming-down operation is carried out at the high speed, the failure occurred in the automatic tracking operation in connection with the zooming operation can be solved, and the object can be tracked under stable condition.

The above-described automatic tracking apparatus, according to the present invention, is featured by further comprising: estimating means for estimating a move destination to which the object is moved while the zooming magnification of the camera is changed by the first zooming control means; first panning/tilting control means for controlling a panning angle and a tilting angle of the camera toward the estimated move destination of the object; and second panning/tilting control means for controlling the panning angle and the tilting angle of the camera in connection with movement of the object tracked by the tracking means in such a manner that the object is not deviated from the image.

With employment of the above-described arrangement, in such a case that the zooming control operation is carried out when the tracking operation is commenced, the move destination of the detected object is estimated, and both the panning angle and the tilting angle are controlled based upon the estimated move destination. As a result, it is possible to avoid such a phenomenon that tracking of the object is lost within the image, while the zooming-up process operation is carried out. As a consequence, the automatic tracking operation of the object can be carried out under stable condition.

In the above-described automatic tracking apparatus of the present invention, the second zooming control means controls the zooming magnification at a lower speed, as compared with that of the first zooming control means. With employment of the above-described arrangement, the object can be secured with having the stable dimension on the image.

In the above-explained automatic tracking apparatus of the present invention, the second zooming control means controls the panning angle and the tilting angle at lower speeds, as compared with those of the first panning/tilting control means. With employment of the above-described arrangement, the object can be tracked in a more stable manner.

In the above-described automatic tracking apparatus of the present invention, the estimating means estimates the move destination at any one later time instant which is selected from a time instant when changing of the zooming magnification by the first zooming control means is accomplished, and another time instant when controlling of the panning angle and the tilting angle by the first panning/tilting control means is accomplished; and in which the first panning/tilting control means controls the panning angle and the tilting angle of the camera toward the estimated move destination of the object. With employment of the above-described arrangement, while the zooming process operation is carried out, the move destination position of the object can be firmly grasped.

An automatic tracking method, according to the present invention, is featured by such an automatic tracking method for tracking a moving object, comprising: a first object detecting step for detecting the object from an image photographed by a camera which is equipped with a zooming mechanism and photographs at a predetermined image angle; a first zooming control step for changing zooming magnification of the camera in such a case that a dimension of the detected object cannot satisfy a predetermined condition on the image; a second object detecting step for detecting the object from an image again photographed by the camera after the zooming magnification has been changed; a tracking step for comparing the object detected by the second object detecting step with the image photographed by the camera so as to specify a position of the object and to track the object on the image; and a second zooming control step for controlling the zooming magnification of the camera in such a manner that a dimension of the object to be tracked becomes a predetermined dimension on an image which is photographed by the camera.

With employment of the above-described sequential operations, while either the zooming-up operation or the zooming-down operation is carried out in the higher speed, the failure occurred in the automatic tracking operation in connection with the zooming operation can be solved, and the object can be tracked under stable condition.

In the above-described automatic tracking method of the present invention, the automatic tracking method is comprised of: an estimating step for estimating a move destination to which the object is moved while the zooming magnification of the camera is changed by the first zooming control step; a first panning/tilting control step for controlling a panning angle and a tilting angle of the camera toward the estimated move destination of the object; and a second panning/tilting control step for controlling the panning angle and the tilting angle of the camera in connection with movement of the object tracked by the tracking step in such a manner that the object is not deviated from the image.

With employment of the above-described automatic tracking method, furthermore, it is possible to avoid such a phenomenon that tracking of the object is lost within the image, while the zooming-up process operation is carried out. As a consequence, the automatic tracking operation of the object can be carried out under more stable condition.

The present invention is to provide a program for causing a computer to function as the respective means of the automatic tracking apparatus recited in any one of the above-explained inventive ideas.

Advantage of the Invention

In accordance with the present invention, it is possible to provide the automatic tracking apparatus and the automatic tracking method, which are capable of solving the failure occurred in the automatic tracking operation in connection with the zooming operation, and capable of tracking the object in the stable manner, while the zooming-up operation, or the zooming-down operation is carried out in the high speed.

Figure 1:
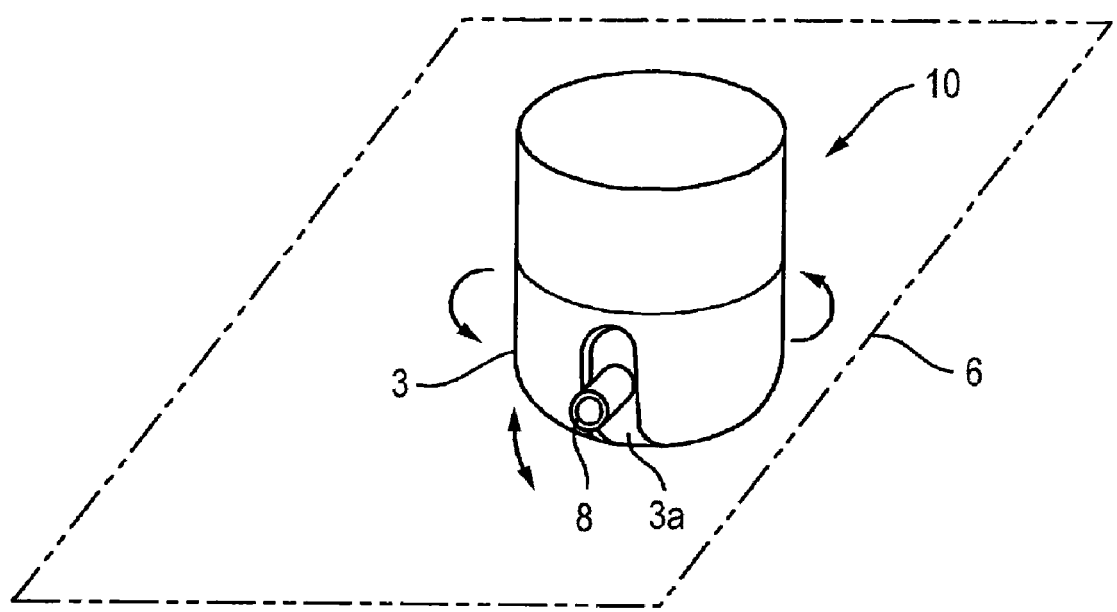
FIG. 1 is a diagram for showing an outer structural view of an automatic tracking camera according to an embodiment mode of the present invention.

DESCRIPTION OF REFERENCE NUMERALS AND SIGNS 8 camera
11 rotation table
10 imaging unit (automatic tracking camera)
20 control unit
21 CPU
22 ROM
23 RAM
24 image memory
30 monitor
51 image inputting unit
52 first object detecting unit
53 first zooming control unit
54 first panning/tilting control unit
55 second object detecting unit
56 template matching unit
57 second zooming control unit
58 second panning/tilting control unit
59 image outputting unit

BEST MODE FOR CARRYING OUT THE INVENTION

An automatic tracking apparatus, according to an embodiment mode of the present invention, is applied to a motoring camera system and the like, and has been equipped with a function capable of automatically detecting such an object as a person who has invaded, and capable of automatically tracking the detected object. The above-described monitoring camera system has mounted thereon an automatic tracking camera capable of performing panning, tilting, and zooming operations (namely, PTZ operations).

FIG. 1 is a diagram for showing an outer structural view of an automatic tracking camera 10 according to the present embodiment mode of the present invention. The automatic tracking camera 10 has a dome type case 3 installed on a ceiling 6. A camera 8 equipped with an optical zooming mechanism, and a rotation table 11 (refer to FIG. 2) have been stored in the dome type case 3. The camera 8 equipped with the optical zooming mechanism is exposed from a groove portion 3a formed in such a manner that this camera 8 penetrates through a center portion of a tip portion of the groove portion 3a. The above-described rotation table 11 can freely rotate the camera 8 at an angle of 360 degrees along a panning direction, and further, can freely rotate the camera 8 at an angle of 180 degrees along a tilting direction. The camera 8 photographs an image at an image angle which is adjusted by the above-described optical zooming mechanism.

Figure 2:
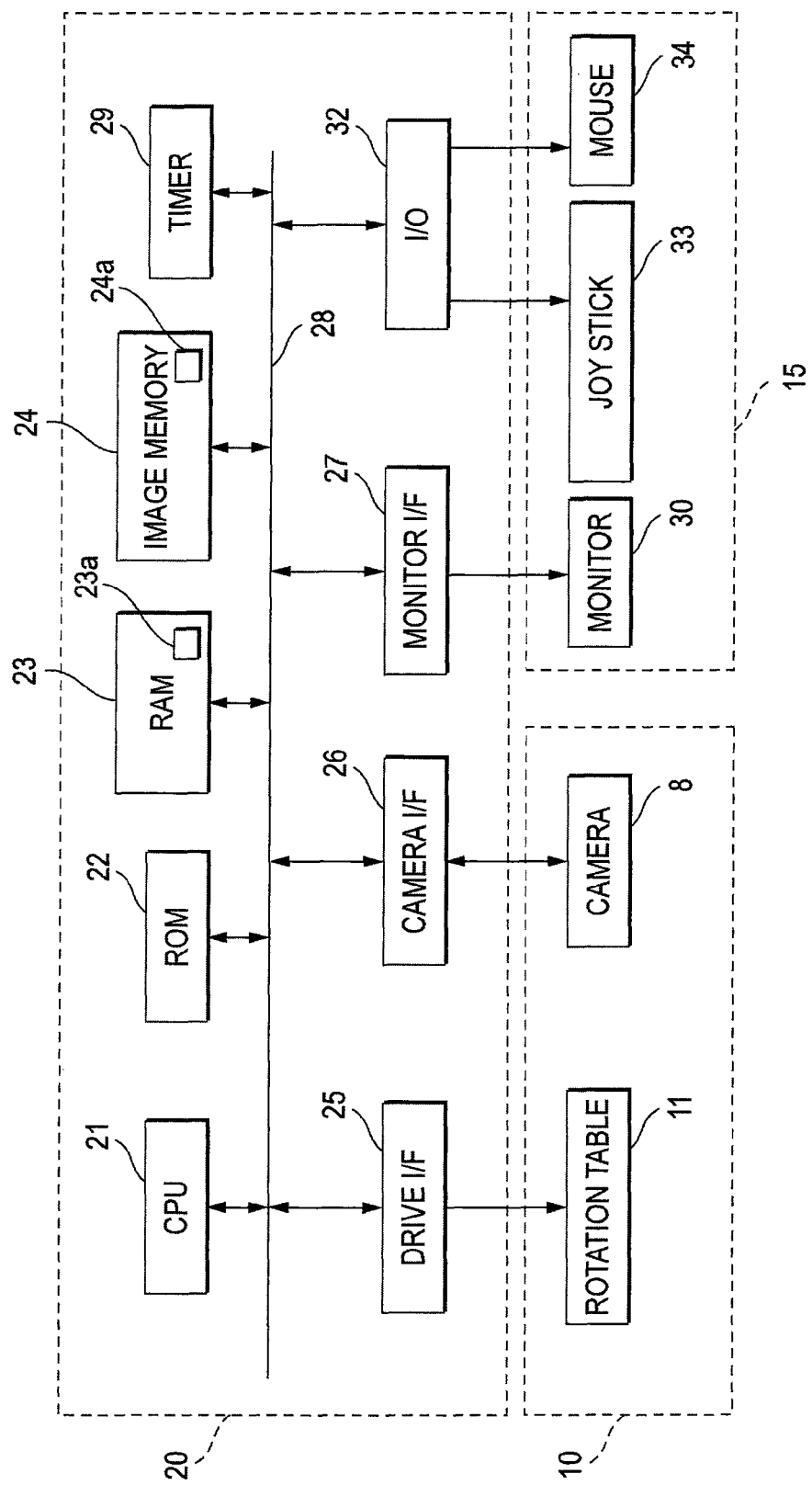
FIG. 2 is a block diagram for representing a hardware arrangement of a monitoring camera system according to the present embodiment mode.

FIG. 2 is a block diagram for indicating a hardware structure of the monitoring camera system according to the present embodiment mode. The monitoring camera system is mainly arranged by an imaging unit (automatic tracking camera) 10, and a data processing unit which is constituted by an operation display unit 15 and a control unit 20.

As previously described, the imaging unit 10 contains the camera 8 stored in the dome type case 3, and the rotation table 11. The operation display unit 15 has a monitor 30, a joy stick 33, and a mouse 34.

The control unit 20 contains such an arrangement constructed by employing the below-mentioned structural elements connected to each other via a bus 28: These structural elements are well known in the technical field, namely, a CPU 21; a ROM 22; a RAM 23; an image memory 24 which stores thereinto an image photographed by the camera 8; a drive interface (I/F) 25 which drives the rotation table 11; a camera (I/F) 26 which controls a zooming operation, a shutters and the like of the camera, and also, inputs an image photographed by the camera 8; a monitor (I/F) 27 which outputs a photographed image to the external monitor 30; a timer 29 which counts a time instant; and an input/output (I/O) interface 32.

A searching range storage unit 23c for storing thereinto a set searching range has been provided in the RAM 23. A template storage unit 24a into which a template image is registered has been provided in the image memory 24. Both the joy stick 33 and the mouse 34 have been connected to the I/O interface 32, which issue input instructions with respect to a photographed image displayed on the monitor 30.

Figure 3:
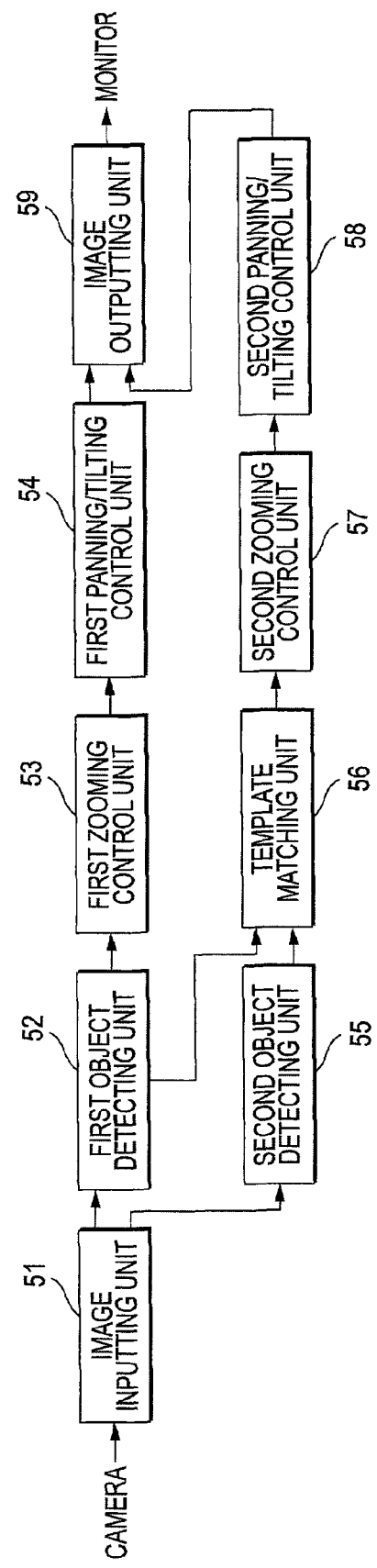
FIG. 3 is a block diagram for showing a functional structure of a control unit employed in the monitoring camera system according to the present embodiment mode.

FIG. 3 is a block diagram for showing a functional structure of the control unit 20 provided in the monitoring camera system according to the present embodiment mode. The control unit 20 has such a functional structure which is equipped with: an image inputting unit 51; a first object detecting unit 52; a first zooming control unit 53; a first panning/tilting control unit 54; a second object detecting unit 55; a template matching unit 56; a second zooming control unit 57; a second panning/tilting control unit 58; and an image outputting unit 59. The image inputting unit 51 inputs an image photographed by the camera 8 provided in the photographing unit 10.

In this case, the first object detecting unit 52 corresponds to an example of first object detecting means; the first zooming control unit 53 corresponds to an example of first zooming control means; the second objet detecting unit 55 corresponds to an example of second object detecting means; the template matching unit 56 corresponds to an example of tracking means; and the second zooming control unit 57 corresponds to an example of second zooming control means. The first panning/tilting control unit 54 has a function of estimating means and a function of first panning/tilting control means. Further, the second panning/tilting control unit 58 has a function of second panning/tilting control means.

The first object detecting unit 52 detects an object which invades in an image by detecting a temporal change inputted from the image input unit 51. In this object detecting operation, for instance, the inter frame difference method is employed so as to detect an object area, while the inter frame difference method is widely known as motion detecting means within an image. In other words, a difference absolute value is calculated with respect to each of pixels among a plurality of images acquired at different photographing time instants, and in such a case that this calculated difference absolute difference value exceeds a threshold value, it is so judged that the relevant area is an area where motion has occurred. In the case that areas where the motion has occurred are detected as such a cluster shape having a dimension larger than, or equal to a predetermined dimension (for example, ratio of height of object with respect to height of image is 1/10), and furthermore, a move locus as to a center of gravity of the cluster can satisfy a predetermined condition (for instance, gravity center is moved along predetermined direction and at substantially constant velocity), it is so judged that an object has invaded into an image (namely, moving object is located).

Figure 4:
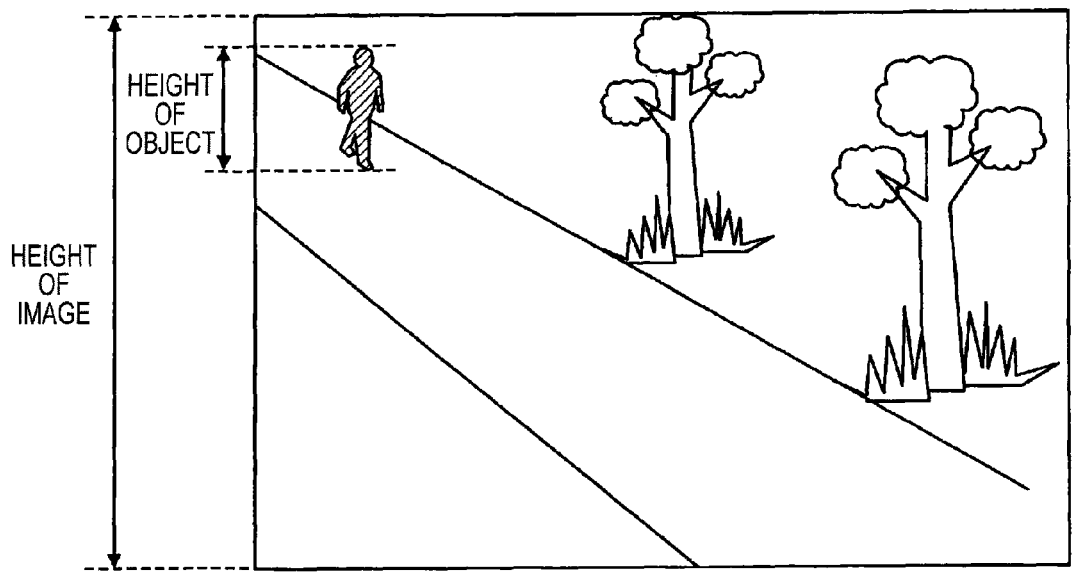
FIG. 4 is a diagram for indicating an image which contains an area where motion detected based upon a temporal change of the image has been produced.

FIG. 4 is a diagram for showing an image which contains an area where motion detected based upon a temporal change of images has been produced. In this drawing, the area where the above-described motion occurred has been illustrated by a hatched line. In the monitoring camera system of the present embodiment mode, it has been supposed that the area where the motion occurred corresponds to a human being, namely, an invaded object is a person.

The first zooming control unit 53 changes zooming magnification of the camera 8 in such a case that a dimension of an image of an object area cannot satisfy a predetermined condition. In order that the zooming magnification is changed, a judgement is made whether or not a dimension of an object detected by the first object detecting unit 52 on the image can satisfy the predetermined condition; and in such a case that the dimension of the detected object image is excessively small, the image of this detected object is zoomed up until target zooming magnification can be achieved in order that the excessively small dimension of the detected object may be viewed as a predetermined dimension of this detected object. Conversely, it is conceivable that a dimension of a detected object image is zoomed down. However, in a general-purpose monitoring camera system, there are many possibilities that under such a condition that an abnormal event has not yet happened to occur, a zoom lens is set to a wide-angle side thereof, whereas if an object to be observed happens to invade, then the zoom lens is set to a telephoto size in order to zoom up the object to be observed.

Figure 5:
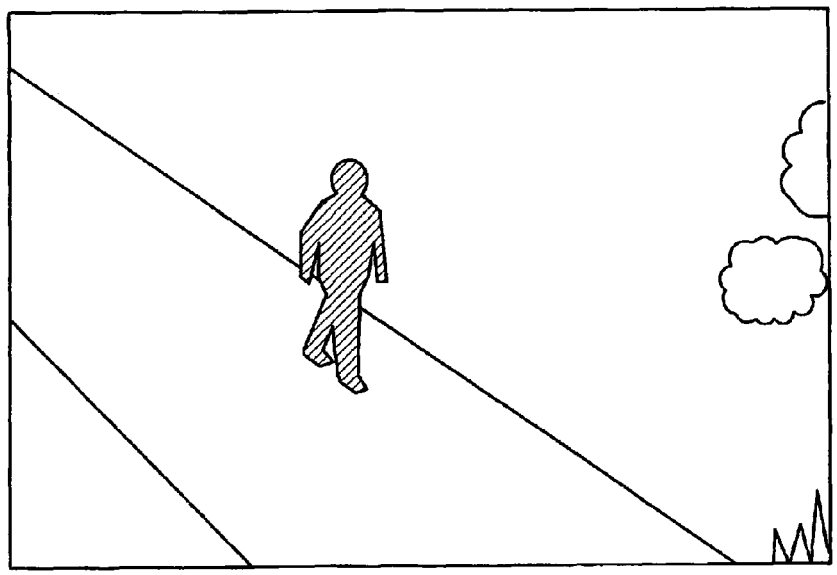
FIG. 5 is a diagram for indicating an image which contains a zoomed-up object.

FIG. 5 is a diagram for showing such an image which contains a zoomed-up object. In the present embodiment mode, assuming now that the detected object corresponds to a person, in such a case that a ratio of an entire height of the person with respect to a height of an image is smaller than a threshold value "TH1" (for example, 1/5), the zooming magnification is changed in such a manner that an image of this person may be viewed whose ratio is approximately 1/4 to 1/2.

The first panning/tilting control unit 54 controls both a panning angle and a tilting angle toward an estimated move position of an object. The control operations of the panning angle and the tilting angle are carried out at the same time when a zooming control operation is executed by the first zooming control unit 53. The first panning/tilting control unit 54 performs a centering process in order that the object detected by the first object detecting unit 52 is not deviated from an area of an image (photographed image), so that a photographing operation is carried out in the vicinity of a center of the image under stable condition.

However, there are some cases that a time duration defined from several hundreds milliseconds up to several milliseconds is required after the first zooming control unit 53 has issued a starting instruction of a zooming control operation with respect to the imaging unit 10 until the imaging unit 10 accomplishes the zooming control operation. In the worst case, when a panning control operation, a tilting control operation, and a zooming control operation have been just accomplished, the following case may be conceived: That is, a moving object has not already been present a center of an image, or may be deviated out from the image.

As a consequence, in the present embodiment mode, assuming now that the moving object is moved at approximately a speed of walking of a person by utilizing a move locus of the object, which is calculated by the first object detecting unit 52, while both the panning angle and the tilting angle are controlled toward such a position of the object at a scheduled time instant when the panning, tilting and zooming control operations are accomplished, the camera 8 is moved and rotated. In other words, a position to which the object might be moved, but not the present position is estimated, and thus, a panning control operation and a tilting control operation are carried out based upon the estimated position. As the estimation of the move destination, such a move destination at any one later time instant may be estimated, which is selected from a time instant when changing of the zooming magnification is accomplished, and another time instant when the control operations of the panning angle and the tilting angle are accomplished. In this case, it should be understood that time durations required for the panning, tilting, and zooming control operations may be previously calculated in response to control amounts.

It should be understood that a move destination of an object is not estimated based upon only a move direction of the object and a general walking speed of a person, but a move velocity of the object may be actually calculated, and then, a panning angle and a tilting angle may be alternatively calculated by employing the calculated move velocity. As a result, even when a slightly lengthy time is required for the panning control operation and the tilting control operation, the detected object may be grasped at a position in the vicinity of a center of an image at such a time instant when both the panning control operation and the tilting control operation are accomplished.

The second object detecting unit 55 again detects such an object which should be present within an image produced after panning, tilting, and zooming (PTZ) control operations have been carried out. In this case, similar to the above-described first object detecting unit 52, the second object detecting unit 55 extracts an area where motion has been produced based upon the inter frame difference method; and in such a case that a feature amount such as a dimension of an object and a move locus of the object can satisfy a predetermined condition, the second object detecting unit 55 detects the above-described area as an object. In this object detecting process operation, all the PTZ control operations of the camera 8 have been accomplished, and have been temporarily brought into stationary statuses.

It should be noted that since the object which constitutes a photographing object has been photographed in larger and more detailed manners, as compared with that of the object detecting process operation executed by the first object detecting unit 52, the precision of the detection condition may be alternatively changed, different parameters of the second object detecting unit 52 may be alternatively set with respect to the parameters of the first object detecting unit 52, or the object detecting process operation by the second object detecting unit 55 may be alternatively made different from that by the first object detecting unit 52. Further, while feature amounts such as a color, a luminance pattern, a histogram thereof as to a moving object detected by the first object detecting unit 52 have been previously stored, the second object detecting unit 55 may alternatively detect an object by additionally judging whether or not the relevant object is an object having feature amounts approximated to the above-described feature amounts.

The template matching unit 56 extracts a feature of an object detected by the second object detecting unit 55 as a template, and tracks an object area while calculating correlationship between this extracted template and an inputted image within searching range. It should be noted that when a dimension of an object detected by the first object detecting unit 52 on an image can satisfy a predetermined condition, the template matching unit 56 extracts a feature of the object detected by the first object detecting unit 52 as a template.

Figure 6:
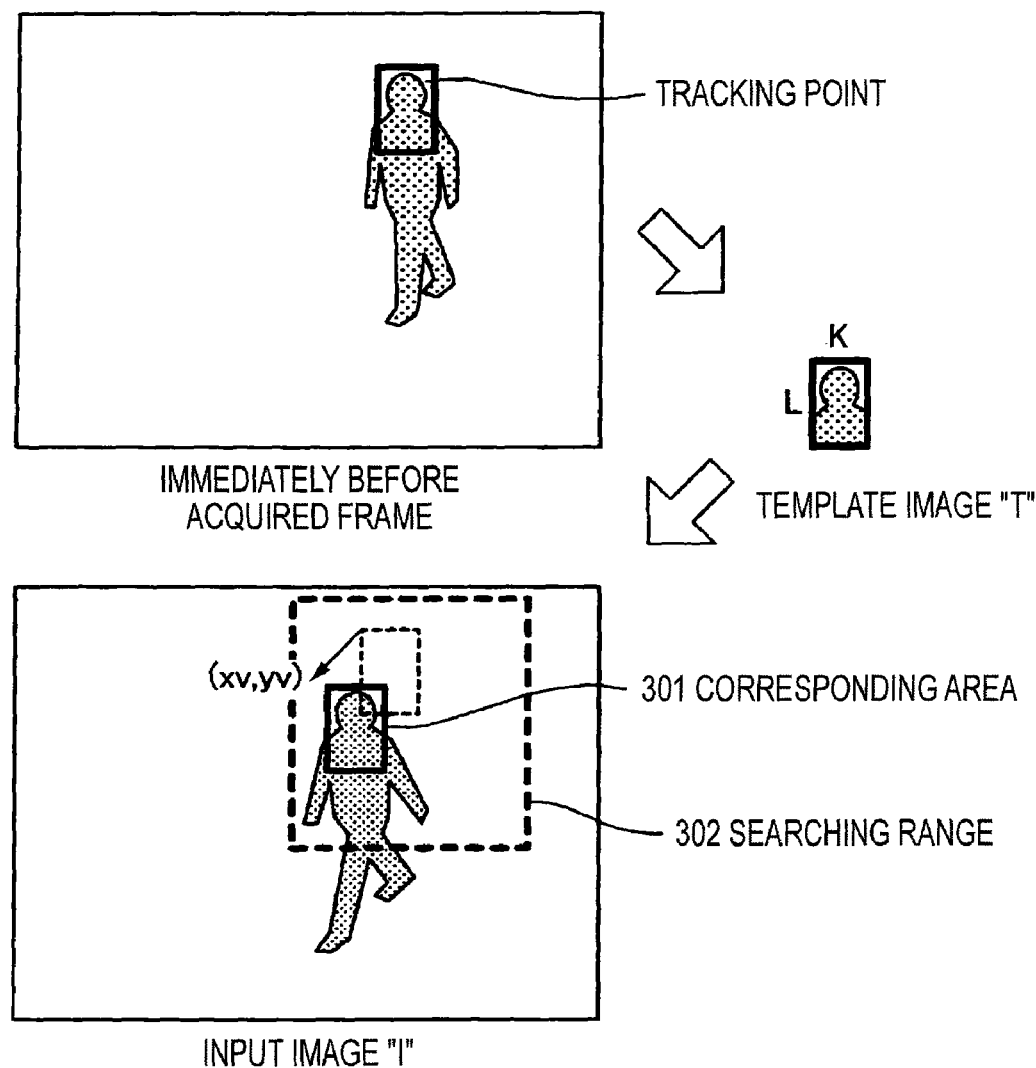
FIG. 6 is a diagram for representing a template matching operation according to the present embodiment mode.

FIG. 6 is a diagram for indicating a template matching operation related to the present embodiment mode. Firstly, the template matching unit 56 extracts an initial template image (tracking point) from such an area that the second object detecting unit 55 has detected an object. The template matching unit 56 extracts one acquired image, or a plurality of images whose updating time instants are different from each other with respect to the same object, and then, stores the extracted images in the template storage unit 24*a*. In such a case that correlation between the existing template images and an inputted image becomes low, the template matching unit 56 adds template images, the total number of which becomes an upper limit storageable number thereof. When the added template images reaches the upper limit storage-able number, the older template image data may be updated based upon the new template image data. It should be understood that it is effective when several sheets through several tens of sheets as to template images acquired in the past are continuously stored. Alternatively, one sheet of such a template image acquired in the past may be continuously stored.

Then, the template matching unit 56 repeatedly searches a corresponding area 301 from an input image "I" every time periods of several tens ms up to several hundreds ms, the correlation of which becomes the highest value with respect to a template image "T" so as to track an object. In such a case that a plurality of template images are present, the template matching unit 56 searches the corresponding area 301 by employing all template images which constitute a subject.

As a range to be searched, the template matching unit 56 sets such a searching area 302 constructed of several tens of pixels along a horizontal direction and a vertical direction with respect to the latest input image "I", while such an area having the highest correlation with the template image in the preceding process operation is defined as a reference area. The template matching unit 56 sequentially acquires correlation with respect to the template image "T", while scanning an area within this searching range 302. It should be understood that although it is conceivable that a searching range may be defined based upon an entire area of an input image, generally speaking, the searching range is limited due to the following reasons: That is, a calculation amount for the entire area of the input image is excessively increased, an erroneous corresponding area is easily produced, and the like. Although, a dimension of a searching range may be limited based upon motion of an object, it is desirable to limit the dimension of this searching range from several pixels up to approximately several tens of pixels along the horizontal direction and the vertical direction.

In the present embodiment mode, as an index of a correlation value, such a case that a normalized function has been employed is represented. In the case that a dimension of the template image "T" is defined as K(H)*L(V) pixels, normalized correlation "NRM(xv, yv)" between a template image "T(p,q)" and a rectangular area made of the K(H)*L(V) pixels within a present frame image "I(x, y)" may be expressed by the below-mentioned formula (1):

Formula 1

$$\text{normalized correlation value } NRML\,(xv,\,yv) = \frac{\sum_{p=0}^{K}\sum_{q=0}^{L}(I(xv+p,\,yv+q)-\bar{I})(T(p,\,q)-\bar{T})}{\sqrt{\sum_{p=0}^{K}\sum_{q=0}^{L}(I(xv+p,\,yv+q)-\bar{I})^2} + \sqrt{\sum_{p=0}^{K}\sum_{q=0}^{L}(T(p,\,q)-\bar{T})^2}} \quad (1)$$

Note: It is so assumed that an average of luminance in a rectangular area (K*L pixels) within the present frame is "Ī", and an average of luminance in the template image is "T̄."

With respect to the normalized correlation "NRM(xv, yv)", the higher the correlation between both the images is increased, the closer the normalized correlation value becomes nearly equal to a value of 1.0. When there is no correlation between both the images, the normalized correlation value becomes a value of 0.

Figure 7:
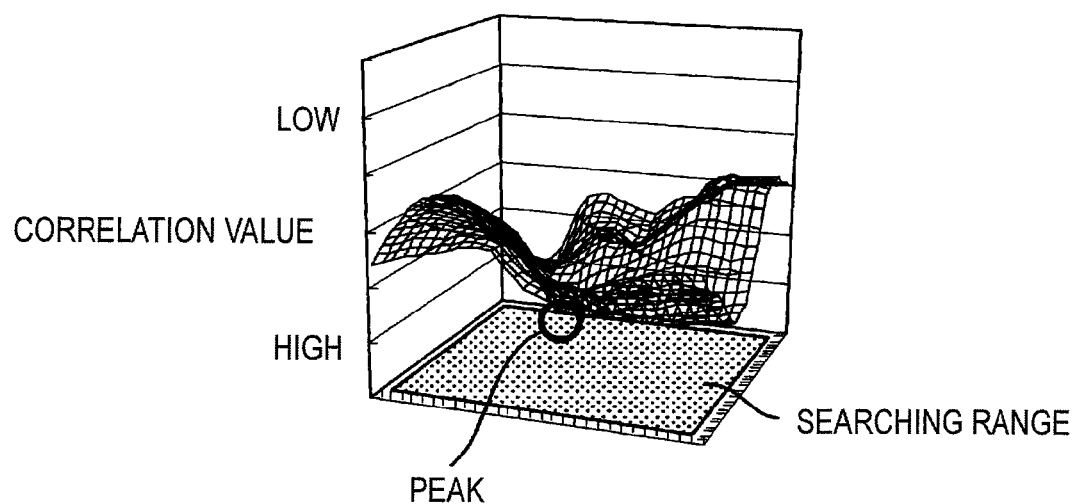
FIG. 7 is a diagram for representing a correlation map in which correlation values of respective positions within a searching area are indicated in a two-dimensional array.

FIG. 7 is a diagram for showing a correlation map in which correlation values of the respective positions within a searching area are represented in a two-dimensional array. In the correlation map, the corresponding area 301 whose correlation value becomes a peak corresponds to a move destination of an object. It should be understood that in FIG. 7, the correlation values have been represented in such a manner that the higher the correlation value becomes, the peak may appear on the side of a valley.

In the present embodiment mode, the below-mentioned case has been exemplified: That is, the correlation values between the input images and the template images have been calculated by employing the normalized correlation. Alternatively, the correlation values between the input images and the template images may be calculated by employing a difference method having a smaller calculation amount, or a difference absolute value summing method. The present embodiment mode has exemplified such a case that the correlation value between the input images and the template images is calculated by employing the luminance value. Alternatively, in order to calculate the correlation values, colors, edges, or the like may be alternatively employed depending upon situations.

Generally speaking, a size of a template image is set to be such a dimension which contains an entire portion of an object area. Alternatively, one featured portion of an object, for instance, a peripheral portion of a head portion of the objet area may be extracted as a template image. When an initial template image is formed when a tracking operation is commenced, the above-described images of the objects detected by the first object detecting unit 52 and the second object detecting unit 55, or images of positions designated by such a pointing device as the joy stick 33, the mouse 34, and the like by an operator may be alternatively utilized. Further, alternatively, an area having high probability at which a desirable object is present within an image may be recognized so as to be extracted. Otherwise, another technical idea may be conceived by which a template image of an object has been previously prepared, while this object is wanted to be tracked.

The second zooming control unit 57 controls the zooming magnification of the camera 8 in order that an object may be photographed with having a proper dimension thereof while the object is being tracked. The first zooming control unit 53 controls the zooming magnification at a higher speed as being permitted as possible, whereas the second zooming control unit 57 controls the zooming magnification at a relatively lower speed in such a degree that no adverse influence is given to the tracking operation of the object by the template matching unit 56, namely, in such a manner that the image may be gently enlarged and compressed. This reason is given as follows: That is, since the zooming control operation by the second zoom control unit 57 is very fine, even when the zooming magnification is controlled at the low speed, the time required for the zooming control operation is short. A dimension of an object under tracking operation is changed in combination with a change in distances measured from a camera. In such a case that a dimension of an object exceeds a predetermined range on an image, the second zooming control unit 57 controls the zooming magnification in order that the dimension of the object is not deviated from the predetermined range. For instance, in such a case that a person makes an approach to a camera, since a dimension of an object is increased on an image, when the dimension of the object exceeds the predetermined range, the second zooming control unit 57 controls the zooming magnification to the wide-angle side in order that the object may be stored in the predetermined range.

The second panning/tilting control unit 58 controls both a panning angle and a tilting angle in combination with movement of the object area acquired by the template matching unit 56 in order that an object under tracking operation is not deviated from an image. As a consequence, even when the object under the tracking operation is moved within a monitoring section, this object may be continuously photographed at positions in the vicinity of a center of a screen. The first panning/tilting control unit 54 has performed the panning/tilting control operations at a higher speed as being permitted as possible, whereas the second panning/tilting unit 57 controls both the panning angle and the tilting angle at a relatively lower speed in such a degree that no adverse influence is given to the tracking process operation of the object by the template matching unit 56.

The image outputting unit 59 superimposes a processed result and the like on an input image, and then, outputs the superimposed image to the external monitor 30.

Figure 8:
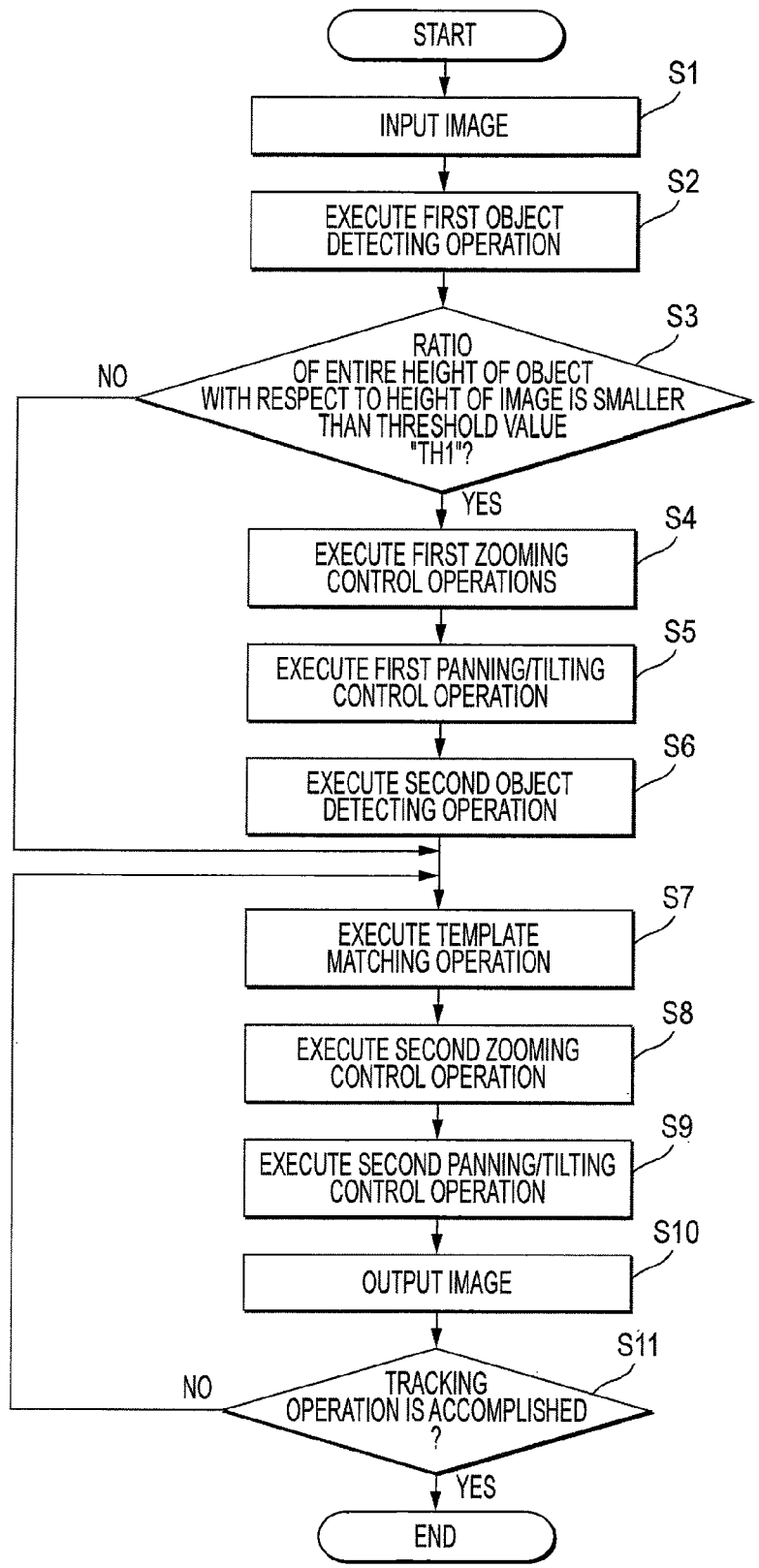
FIG. 8 is a flow chart for describing an automatic tracking process sequence according to the present embodiment mode of the present invention.

A description is made of operations of the monitoring camera system equipped with the above-described arrangement. FIG. 8 is a flow chart for describing an automatic tracking process sequence related to the present embodiment mode. This process program has been stored in the ROM 22, and is executed by the CPU 21 in the monitoring camera system.

Firstly, the CPU 21 executes a process (capture) operation for capturing an image photographed by the camera 8 (step S1). The CPU 21 detects a temporal change in the captured images so as to detect an object invaded in the captured image (step S2).

In the present embodiment mode, in the case that areas in which motion has occurred are detected as such a cluster shape having a dimension larger than, or equal to a predetermined dimension (for example, ratio of height of object with respect to height of image is 1/10), and furthermore, a move locus as to a center of gravity of the cluster can satisfy a predetermined condition (for instance, gravity center is moved along predetermined direction and at substantially constant velocity), the CPU 21 judges that the object has invaded into the image. In this case, it is so assumed that the invaded object is a person as a subject to be tracked (refer to FIG. 4).

Then, the CPU 21 judges whether or not a dimension of the detected object area can satisfy the predetermined condition on the image (step S3). In this case, the CPU 21 judges whether or not a ratio of a height of the object area (entire length) with respect to a height of the image is smaller than a threshold value "TH1 (for example, 1/5)." In such a case that the ratio of the height of the object with respect to the height of the image is smaller than the threshold value "TH1", the zooming magnification of the camera 8 is changed (step S4), and both the panning angle and the tilting angle are controlled toward an estimated move destination of the object are controlled (step S5). As previously described, the CPU 21 controls the zooming magnification, the panning angle, and the tilting angle of the camera 8 in order that the dimension of the object becomes the predetermined dimension in the steps S4 and S5, and thereafter, again detects an object (step S6).

On the other hand, in such a case that the ratio of the height of the object with respect to the height of the image is larger than, or equal to the threshold value. "TH1", the CPU 21 does not execute the process operations defined it the above-described steps S4, S5, and S6.

Thereafter, a feature of the detected object is extracted as a template image, and then, a template matching operation is carried out by which an object area is tracked within a searching range, while calculating correlation between this extracted template image and the inputted image (step S7). The zooming magnification of the camera 8 is controlled in such a manner that the object may be photographed with having a proper dimension during the tracking operation (step S8). Moreover, both the panning angle and the tilting angle are controlled in combination with the movement of the object area obtained in the template matching operation in order that the object is not deviated from the image during the tracking operation (step S9). An image produced from the camera 8 is outputted to the monitor 30, while the zooming magnification, the panning angle, and the tilting angle of the camera 8 have been controlled (step S10). Then, the CPU 21 judges whether or not the tracking operation is accomplished (step S11). When the tracking operation is accomplished, the CPU 21 accomplishes the present process operation. As this case that the CPU 21 judges that the tracking operation is accomplished, the below-mentioned cases may be conceived: namely, for example, one case that an object area has been moved to an area where the object cannot be photographed by the photographing unit 10 (namely, out of monitoring area); another case that an instruction for accomplishing the tracking operation is issued; and the like. On the other hand, in such a case where the tracking operation is not yet accomplished, the process operation is returned to the above-described process operation defined in the step S7.

As previously described, in the monitoring camera system of the present embodiment mode, in such a case that the detected object has been viewed on the photographed image, the dimension of which is smaller than the predetermined dimension, while the tracking operation is not immediately commenced, the object is zoomed at the high speed until the dimension of the object becomes the predetermined dimension. Thereafter, this object is detected on such an image which has been again photographed, and the tracking operation thereof is commenced. As a result, it is possible to avoid an unstable tracking process operation caused by executing the zooming control operation for a long time period, and thus, the stable tracking operation can be realized.

In the case that the object is zoomed up at the high speed until the dimension of the zoomed-up object becomes the predetermined dimension, although such a time of approximately several seconds is required in order to perform above-described zooming control operation, the move destination position of the object during this time is estimated, and both the panning angle and the tilting angle are controlled toward this estimated move destination position. As a consequence, the object can be again detected by employing such an image which has firmly grasped the object which had been detected after the zooming-up operation. Accordingly, a more stable tracking operation can be realized.

It should be understood that the present invention is not limited only to the above-described arrangements of the embodiment modes, but may be alternatively modified in various manners. For instance, while the above-described embodiment mode has exemplified such a case that while the invaded object has been assumed as the human being, the first zooming control unit has performed the zooming control operation based upon the ratio of the height of the object with respect to the height of the image. Alternatively, when it is so assumed that an invaded object is an animal other than a human being, the first zooming control unit may perform a zooming control operation based upon a width of the object and an area of the object.

In the above-described embodiment mode, the polar coordinates having the panning angle and the tilting angle have been employed as the three-dimensional coordinates. Alternatively, orthogonal coordinates constructed of an X axis, a Y axis, and a Z axis may be employed so as to control directions of the camera.

In the above-described embodiment mode, the automatic tracking camera 10 and the data processing apparatus (containing control unit 20 and operation display unit 15) have been separately arranged. Alternatively, the automatic tracking camera 10 and the data processing apparatus may be stored in the same housing.

As previously described, in accordance with the present embodiment mode, while either the zooming-up operation or the zooming-down operation is carried out in the higher speed, the failure occurred in the automatic tracking operation in connection with the zooming operation can be solved, and the object can be tracked under stable condition. In other words, it is possible to avoid such a phenomenon that the tracking point is lost, while this phenomenon may easily occur during the zooming-up process operation. In such a case that the zooming control operation is carried out when the tracking operation is commenced, the move destination of the detected object is estimated, and both the panning angle and the tilting angle are controlled based upon the estimated move destination. As a result, it is possible to avoid such a phenomenon that tracking of the object is lost within the image, while the zooming-up process operation is carried out. As a consequence, the automatic tracking operation of the object can be carried out under stable condition.

While the present invention has been described in detail, or with reference to the specific embodiment mode, it is apparent to ordinarily skilled engineers that the present invention may be modified, changed, and substituted in various manners without departing from the technical scope and spirit of the present invention.

The present patent application has been filed on the basis of claiming Japanese Patent Application (JP-A-2006-022887) filed on Jan. 31, 2006, the contents of which have been incorporated herewith by references.

INDUSTRIAL APPLICABILITY

The present invention has been suitably applied to such an automatic tracking apparatus and an automatic tracking method, capable of tracking a moving object, which have such an effect capable of solving a failure occurred in an automatic tracking operation in connection with a zooming control operation, and also capable of tracking an object under stable condition, while either a zooming-up operation or a zooming-down operation is carried out with respect to the object at a high speed.

The invention claimed is:

1. An automatic tracking apparatus for tracking a moving object, comprising:
   a first object detector that detects the object from an image photographed by a camera which is provided with a zooming mechanism and photographs at a predetermined image angle;
   a first zooming controller that changes zooming magnification of the camera in such a case that a dimension of the detected object does not satisfy a predetermined condition on the image, wherein the first zooming controller changes the zooming magnification at a first speed;
   a second object detector that detects the object from an image again photographed by the camera after the zooming magnification is changed;
   a tracking unit that compares the object detected by the second object detector with the image photographed by the camera so as to specify a position of the object and to track the object on the image; and
   a second zooming controller that controls the zooming magnification of the camera in such a manner that a dimension of the object to be tracked becomes a predetermined dimension on an image which is photographed by the camera, wherein the second zooming controller changes the zooming magnification at a slower speed than the first speed.

2. A non-transitory computer readable recording medium storing a program for causing a computer to function as the first object detector, the first zooming controller, the estimating unit, the first panning/tilting controller, the second object detector, the tracking unit, and the second zooming controller of the automatic tracking apparatus recited in claim 1.

3. The automatic tracking apparatus according to claim 1, wherein, prior to commencing tracking of the object by template matching, the first zooming controller changes the zooming magnification, and
   wherein, after commencing tracking of the object by template matching, the second zooming controller changes the zooming magnification.

4. The automatic tracking apparatus according to claim 3, further comprising:
   a first panning/tilting controller that controls a panning angle and a tilting angle of the camera;
   a second panning/tilting controller that controls the panning angle and the tilting angle of the camera in connection with movement of the object tracked by the tracking unit in such a manner that the object is not deviated from the image; and
   an estimating unit that estimates a move destination at a first time instant or a second time instant, whichever is later, wherein changing of the zooming magnification by the first zooming controller is accomplished at the first time instant, and wherein controlling of the panning angle and the tilting angle by the first panning/tilting controller is accomplished at the second time instant, wherein the first panning/tilting controller controls the panning angle and the tilting angle of the camera toward the estimated move destination of the object.

5. The automatic tracking apparatus according to claim 3, further comprising:
an estimating unit that estimates a move destination, to which the object is moved while the zooming magnification of the camera is changed by the first zooming controller.

6. The automatic tracking apparatus according to claim 5, further comprising:
a first panning/tilting controller that controls a panning angle and a tilting angle of the camera toward the estimated move destination of the object; and
a second panning/tilting controller that controls the panning angle and the tilting angle of the camera in connection with movement of the object tracked by the tracking unit in such a manner that the object is not deviated from the image.

7. The automatic tracking apparatus according to claim 6, wherein the second zooming controller controls the panning angle and the tilting angle at lower speeds, as compared with those of the first panning/tilting controller.

8. The automatic tracking apparatus according to claim 6, wherein the first panning/tilting controller controls the panning angle and the tilting angle of the camera toward the estimated move destination of the object prior to commencing tracking of the object by template matching.

9. An automatic tracking apparatus for tracking a moving object, comprising:
a camera having a zooming mechanism and a rotation table, for photographing at a predetermined image angle;
a first object detector that detects the object from an image photographed by the camera;
a first zooming controller that changes zooming magnification of the camera in such a case that a dimension of the detected object does not satisfy a predetermined condition on the image, wherein the first zooming controller changes the zooming magnification at a first speed;
a second object detector that detects the object from an image again photographed by the camera after the zooming magnification is changed;
a tracking unit that compares the object detected by the second object detector with the image photographed by the camera so as to specify a position of the object and to track the object on the image; and
a second zooming controller that controls the zooming magnification of the camera in such a manner that a dimension of the object to be tracked becomes a predetermined dimension on an image which is photographed by the camera, wherein the second zooming controller changes the zooming magnification at a slower speed than the first speed.

10. The automatic tracking apparatus according to claim 9, wherein, prior to commencing tracking of the object by template matching, the first zooming controller changes the zooming magnification, and
wherein, after commencing tracking of the object by template matching, the second zooming controller changes the zooming magnification.

11. The automatic tracking apparatus according to claim 10, further comprising:
an estimating unit that estimates a move destination, to which the object is moved while the zooming magnification of the camera is changed by the first zooming controller.

12. An automatic tracking method for tracking a moving object comprising:
a first object detecting step including detecting the object from an image photographed by a camera which is equipped with a zooming mechanism and photographs at a predetermined image angle;
changing zooming magnification of the camera at a first speed, in such a case that a dimension of the object does not satisfy a predetermined condition on the image;
a second object detecting step including detecting the object from an image again photographed by the camera after the zooming magnification is changed;
comparing the object detected by the second object detecting step with the image photographed by the camera so as to specify a position of the object and to track the object on the image; and
controlling the zooming magnification of the camera in such a manner that a dimension of the object to be tracked becomes a predetermined dimension on an image which is photographed by the camera, wherein the zooming magnification changes at a slower speed than the first speed.

13. The automatic tracking method according to claim 12, wherein, prior to commencing tracking of the object by template matching, the changing step is performed, and
wherein, after commencing tracking of the object by template matching, the controlling step is performed such that the zooming magnification changes at the slower speed.

14. The automatic tracking method according to claim 13, further comprising:
estimating a move destination, to which the object is moved while the zooming magnification of the camera is changed in the changing step.

15. The automatic tracking method according to claim 14, further comprising;
a first panning/tilting controlling step including controlling a panning angle and a tilting angle of the camera toward the estimated move destination of the object; and
a second panning/tilting controlling step including controlling the panning angle and the tilting angle of the camera in connection with movement of the object tracked in the comparing step in such a manner that the object is not deviated from the image.

16. The automatic tracking method according to claim 15, wherein, prior to commencing tracking of the object by template matching, the first panning/tilting controlling step is performed.

* * * * *